(12) United States Patent
Stoehr et al.

(10) Patent No.: US 9,221,447 B2
(45) Date of Patent: Dec. 29, 2015

(54) COMPRESSED AIR SUPPLY SYSTEM FOR TRUCK TRAILERS AND COMPRESSED AIR SUPPLY METHOD

(75) Inventors: Markus Stoehr, Stuttgart (DE); Martin Mederer, Neumarkt (DE)

(73) Assignee: KNORR-BREMSE SYSTEME FUER NUTZFAHRZEUGE GMBH, Munich (DE)

(*) Notice: Subject to any disclaimer, the term of this patent is extended or adjusted under 35 U.S.C. 154(b) by 594 days.

(21) Appl. No.: 13/148,257

(22) PCT Filed: Feb. 10, 2010

(86) PCT No.: PCT/EP2010/000812
§ 371 (c)(1),
(2), (4) Date: Jan. 25, 2012

(87) PCT Pub. No.: WO2010/091843
PCT Pub. Date: Aug. 19, 2010

(65) Prior Publication Data
US 2012/0112523 A1    May 10, 2012

(30) Foreign Application Priority Data

Feb. 11, 2009   (DE) .......................... 10 2009 008 351

(51) Int. Cl.
| | | |
|---|---|---|
| B60T 13/74 | (2006.01) | |
| B60T 13/26 | (2006.01) | |
| B60T 13/66 | (2006.01) | |
| B60T 13/68 | (2006.01) | |
| B60T 17/02 | (2006.01) | |

(52) U.S. Cl.
CPC ............. *B60T 13/263* (2013.01); *B60T 13/662* (2013.01); *B60T 13/686* (2013.01); *B60T 17/02* (2013.01)

(58) Field of Classification Search
CPC .......... B60T 17/02; B60T 17/18; B60T 8/26; B60T 15/48; B60T 15/50; B60T 8/1708; B60T 13/263; B60T 13/662; B60T 13/686
USPC .......... 303/2, 4, 7, 9.66, 13, 20, 22.1, 57–64, 303/127, 155, DIG. 11
See application file for complete search history.

(56) References Cited

U.S. PATENT DOCUMENTS 5,042,883 A * 8/1991 McCann et al. .................. 303/7
(Continued)

FOREIGN PATENT DOCUMENTS

| DE | 251040 | 6/1911 |
| DE | 1031656 | 6/1958 |
| DE | 202005002036 | 7/2005 |

(Continued)

OTHER PUBLICATIONS

European Patent Office, Translation of International Preliminary Report on Patentability, Aug. 16, 2011, from International Patent Application No. PCT/EP2010/000812, filed on Feb. 10, 2010.

*Primary Examiner* — Pamela Rodriguez
(74) *Attorney, Agent, or Firm* — Kenyon & Kenyon LLP (57) ABSTRACT

A compressed air supply system is described for a truck trailer, which includes at least one first compressed air network, which supplies a pneumatic brake system of the truck trailer with an air pressure limited according to a requirement, and at least one compressed air supply coupling between the tractive vehicle and the truck trailer for supplying compressed air, in which the at least one compressed air supply coupling is configured for a higher air pressure than the limited air pressure according to the requirement.

22 Claims, 4 Drawing Sheets

(56) References Cited

U.S. PATENT DOCUMENTS

| | | |
|---|---|---|
| 5,615,931 A | 4/1997 | Stumpe et al. |
| 6,269,691 B1 | 8/2001 | Sowatzke et al. |
| 2005/0000615 A1 | 1/2005 | Ingram |

FOREIGN PATENT DOCUMENTS

| | | |
|---|---|---|
| GB | 1 502 377 | 3/1978 |
| GB | 1 521 525 | 8/1978 |
| WO | 00/30912 | 6/2000 |

* cited by examiner

COMPRESSED AIR SUPPLY SYSTEM FOR TRUCK TRAILERS AND COMPRESSED AIR SUPPLY METHOD

FIELD OF THE INVENTION

The present invention relates to a compressed air supply system for truck trailers and to a compressed air supply method.

BACKGROUND INFORMATION

Compressed air supply systems of this kind have at least one first compressed air network, which supplies a pneumatic brake system of the truck trailer with an air pressure limited according to EU-wide legal requirements. Compressed air supply systems of this kind for truck trailers furthermore have at least one compressed air supply coupling between the tractive vehicle and the truck trailer for supplying compressed air.

Owing to the limited air pressure, which must be maintained via a compressed air coupling to the truck trailer for a pneumatic brake system on the basis of EU-wide legal requirements, it is not possible using compressed air couplings of this kind to supply automatic tire pressure control systems for the truck trailer, for example. This is because tire pressure control systems require a significantly higher pressure, especially as it is the task of a tire pressure control system to set in an optimum manner an optimum tire pressure while underway, in accordance with the characteristics of the road, the vehicle speed, the vehicle loading, the outside temperature and the extrapolated tire and road surface temperatures, even while underway, by increasing or reducing the tire pressure in the rotating wheels.

Known tire pressure valves are based on the assumption that the tire pressure will be adapted to the corresponding environmental conditions when the vehicle is stationary. This means that the vehicle must interrupt the journey and that the tires will have to be adapted individually and manually to an optimum tire pressure by the vehicle driver. To do this, the practice up to now has been to visit appropriate service stations that have appropriate fixed high-pressure systems in order to provide the compressed air requirement at high pressure.

In order to meet the requirement for regulation of the tire pressure even while underway, not only are special tire pressure control valves required but there is also a need for an appropriate high-pressure supply to the vehicle trailer in order to supply the vehicle trailer with appropriate pressure energy.

U.S. Pat. No. 6,269,691 B1 discusses an automatic tire pressure supply system with a booster pump driven by a compressed air supply having a limited air pressure via the permitted compressed air coupling of the truck trailer. The booster pump consumes a volume of compressed air at the limited air pressure in order to transform compressed air into a higher output pressure for a tire pressure control system since the tires require a higher air pressure than is permitted by a first compressed air network for supplying the brake system of truck trailers. A pressure surge protection valve and a pressure relief valve are additionally provided in the system for a known tire pressure supply and control system of this kind with an additional booster pump in order to ensure smooth operation of the compressed air supply system for the truck trailer.

A compressed air supply system of this kind has the disadvantage that an additional compressor with appropriate additional protection and pressure relief valves has to be provided in the trailer to make available the higher pressure for a tire pressure control system, for example, and to supply an appropriate second high-pressure network in the truck trailer with an appropriate higher air pressure.

SUMMARY OF THE INVENTION

It is an object of the exemplary embodiments and/or exemplary methods of the present invention to make available an improved compressed air supply for a truck trailer in order to supply not only the truck trailer brake system but also other pneumatic loads with a suitable higher air pressure in the truck trailer.

This object may be achieved with the exemplary embodiments and/or exemplary methods of the present invention. Advantageous developments of the exemplary embodiments and/or exemplary methods of the present invention are also disclosed herein.

According to the exemplary embodiments and/or exemplary methods of the present invention, a compressed air supply system for truck trailers and a compressed air supply method are provided. The compressed air supply system has at least one first compressed air network, which supplies a pneumatic brake system of the truck trailer with an air pressure limited according to EU-wide legal requirements for truck trailers. The compressed air supply system furthermore has at least one compressed air supply coupling between the tractive vehicle and the truck trailer for supplying compressed air. The at least one compressed air supply coupling is designed for a higher air pressure than the limited air pressure according to the EU-wide legal requirements.

A compressed air supply system of this kind has the advantage that, in addition to a compressed air line or a compressed air network for the brake system, it is possible to supply a further supply network for the truck trailer with compressed air, to which supply network tire pressure monitoring systems or even air suspension and damping systems can be connected. This results in a better supply performance since no air from the first compressed air network for the braking air circuit is consumed in order to supply a booster or compressor in the truck trailer. Specifically, an air-operated booster consumes a large proportion of the filling capacity of the brake air pressure system to drive the booster or compressor. The costs for a booster of this kind together with the appropriate protection and pressure relief valves thereof are furthermore eliminated. In addition, an improved compressed air supply coupling of this kind has the advantage that tire pressure monitoring systems can be supplied with a higher air pressure by a second compressed air network. Owing to the increased air pressure in a second compressed air network of this kind, it is furthermore possible to fit the air suspension components, such as compressed air springs and pneumatic shock dampers, with spring bellows that take up less space and are less costly.

The limited air pressure for truck trailers may be fixed at 8.5 bar or 0.85 megapascals (MPa) and the at least one compressed air supply coupling for the higher air pressure is designed for an air pressure of up to 1.5 MPa, which may be up to 1.2 MPa. This has the advantage that a second compressed air network can be operated at the higher air pressure in the truck trailer, to which compressed air network a tire pressure control system and/or a pneumatic spring and damping system may be connected.

If the truck has a tractor and a truck trailer with just a single compressed air supply coupling for a higher air pressure than the air pressure permitted throughout the EU, it is advantageously possible to supply the first compressed air network of the truck trailer for the brake system from the second compressed air network via an appropriate pressure control valve. This has the advantage that just a single compressed air supply coupling is required for the coupling system between the tractive vehicle and the truck trailer.

On the other hand, it is also possible to provide a first compressed air coupling having a first air pressure limit for supplying the first compressed air network of the truck trailer and a second compressed air coupling having a second, higher air pressure limit for supplying the second compressed air network of the truck trailer between the tractive vehicle and the truck trailer. Since only one additional compressed air coupling is required for the truck trailer, this solution too provides a less expensive possibility than the prior art for supplying two compressed air networks at different air pressures in the truck trailer with appropriate air pressures.

In another embodiment of the present invention, the truck trailer has at least one compressed air accumulator for the compressed air networks, said accumulator being designed for the higher air pressure than the limited air pressure according to the EU-wide requirements and both compressed air networks of the truck trailer being supplied by and from the same compressed air accumulator, thus saving on the amount of space required and on weight in an advantageous manner.

Moreover, provision is made for the compressed air networks of the truck trailer to interact with a central control device. This control device can act on pressure distribution devices, which are arranged separately for each of the compressed air networks or are provided in a common pressure distribution device. Pressure distribution devices of this kind are then connected to the ultimate loads such as wheel brakes, wheel tires or spring and damping system components by appropriate compressed air lines and valves.

A compressed air supply method for truck trailers has the following method steps. First of all, an air pressure which is higher than a limited air pressure according to EU-wide legal requirements for truck trailers is produced in the tractive vehicle. This higher air pressure is then transferred via at least one compressed air supply coupling, which is designed for a higher air pressure than the limited air pressure, to the compressed air networks of the truck trailer. A first compressed air network in the truck trailer is then supplied with an air pressure permitted throughout the EU and a second compressed air network is supplied with a higher air pressure via the at least one compressed air supply coupling.

In order to supply the first compressed air network, an appropriate pressure-reducing or pressure control valve must be provided as a connection between the second and the first compressed air network. In this case, the limited air pressure for truck trailers is limited to 8.5 bar or 0.85 MPa and the at least one compressed air supply coupling is designed for the higher air pressure of up to 15 bar or 1.5 MPa, which may be up to 12 bar or 1.2 MPa. It is thereby possible in the truck trailer to supply both a first compressed air network with the air pressure permitted throughout the EU and a second compressed air network with the higher air pressure.

The second compressed air network may be used for a tire pressure control system, where it is important to adapt the tire pressure in an optimum manner to external conditions in respect of loading, the condition of the road, the outside temperature among other things, even while underway. It is furthermore possible, by the second compressed air network of the truck trailer, to supply a pneumatic spring and damping system, the components of which can be embodied with a significantly smaller volume than is possible with the previously permissible compressed air system. For this purpose, a first compressed air coupling having a first air pressure limit for supplying the first compressed air network of the truck trailer and a second compressed air coupling having a second, higher air pressure limit for supplying the second compressed air network of the truck trailer can be arranged between the tractive vehicle and the truck trailer.

On the other hand, it is also possible for the first compressed air network of the truck trailer to be supplied from the second compressed air network, and for a single compressed air supply coupling, which is designed for the higher air pressure than the limited air pressure according to the EU-wide requirements, to supply both compressed air networks of the truck trailer.

It is furthermore advantageous to store compressed air for the compressed air networks of the truck trailer at least in one compressed air accumulator, which is designed for the higher air pressure than the limited air pressure according to the EU-wide requirements, and to supply both compressed air networks of the truck trailer from one compressed air accumulator. Here, a central control device controls the compressed air networks of the truck trailer, in particular appropriate pressure distribution devices, which then distribute the compressed air to the individual loads, such as tires, brakes or spring and damping system components via compressed air lines.

The exemplary embodiments and/or exemplary methods of the present invention will now be explained in greater detail with reference to the attached figures.

DETAILED DESCRIPTION

Figure 1:
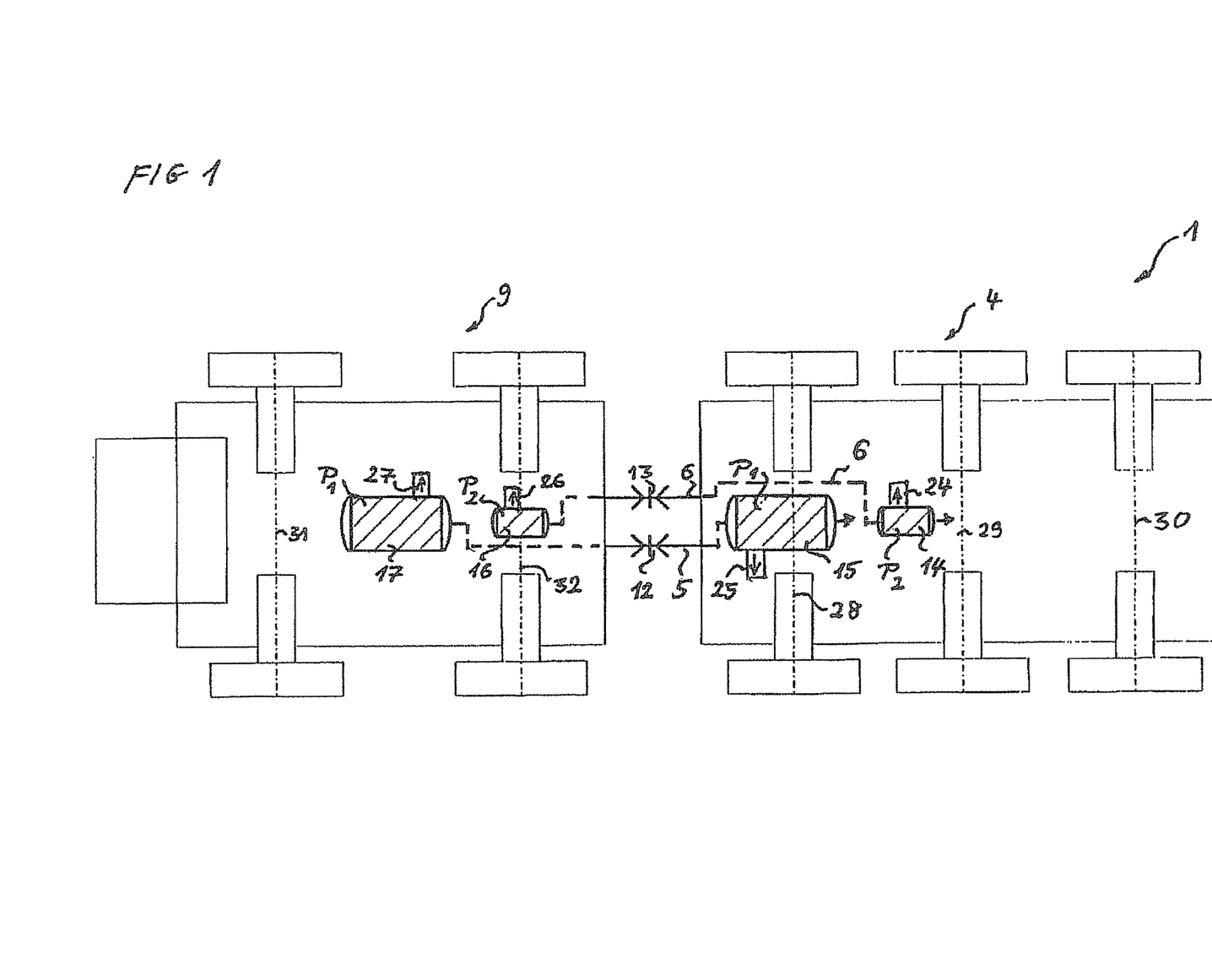
FIG. 1 shows a schematic diagram of a compressed air supply system in accordance with a first embodiment of the present invention.

FIG. 1 shows a schematic diagram of a compressed air supply system 1 in accordance with a first embodiment of the present invention. The compressed air supply system 1 is designed for a tractive vehicle 9 with a truck trailer 4. In this illustrative embodiment, the truck trailer 4 has three axles 28, 29 and 30 and can rest as a semitrailer on the tractive vehicle 9, which has the two axles 31 and 32.

With its engine and a compressor coupled to the latter, the tractive vehicle 9 produces an air pressure $P_1$ limited to 8.5 bar or 0.85 MPa, which is stored in a compressed air accumulator 17, a pressure relief valve 27 responding as soon as the limited air pressure $P_1$ is exceeded. A higher air pressure $P_2$ is furthermore produced in the tractive vehicle 9 and stored in the compressed air accumulator 16, which is protected by a pressure relief valve 26.

The two compressed air accumulators 16 and 17 correspondingly supply a first and a second compressed air network 5 and 6, respectively, for the tractive vehicle and transmit the air pressure of these compressed air networks via a first compressed air coupling 12 to a corresponding compressed air accumulator 15 on the truck trailer 4, which stores the limited air pressure $P_1$ and is protected by a pressure relief valve 25. Via a second compressed air coupling 13, the higher pressure $P_2$ is fed into the second compressed air network 6 and stored in a corresponding compressed air accumulator 14 in the truck trailer, the compressed air reservoir 14 having a pressure relief valve 24 as a protection valve. By the two compressed air couplings 12 and 13 and the two compressed air accumulators 14 and 15, it is possible to supply a first compressed air network 5 for the first air pressure $P_1$ and a second compressed air network 6 for the higher air pressure $P_2$ in the truck trailer.

Figure 2:
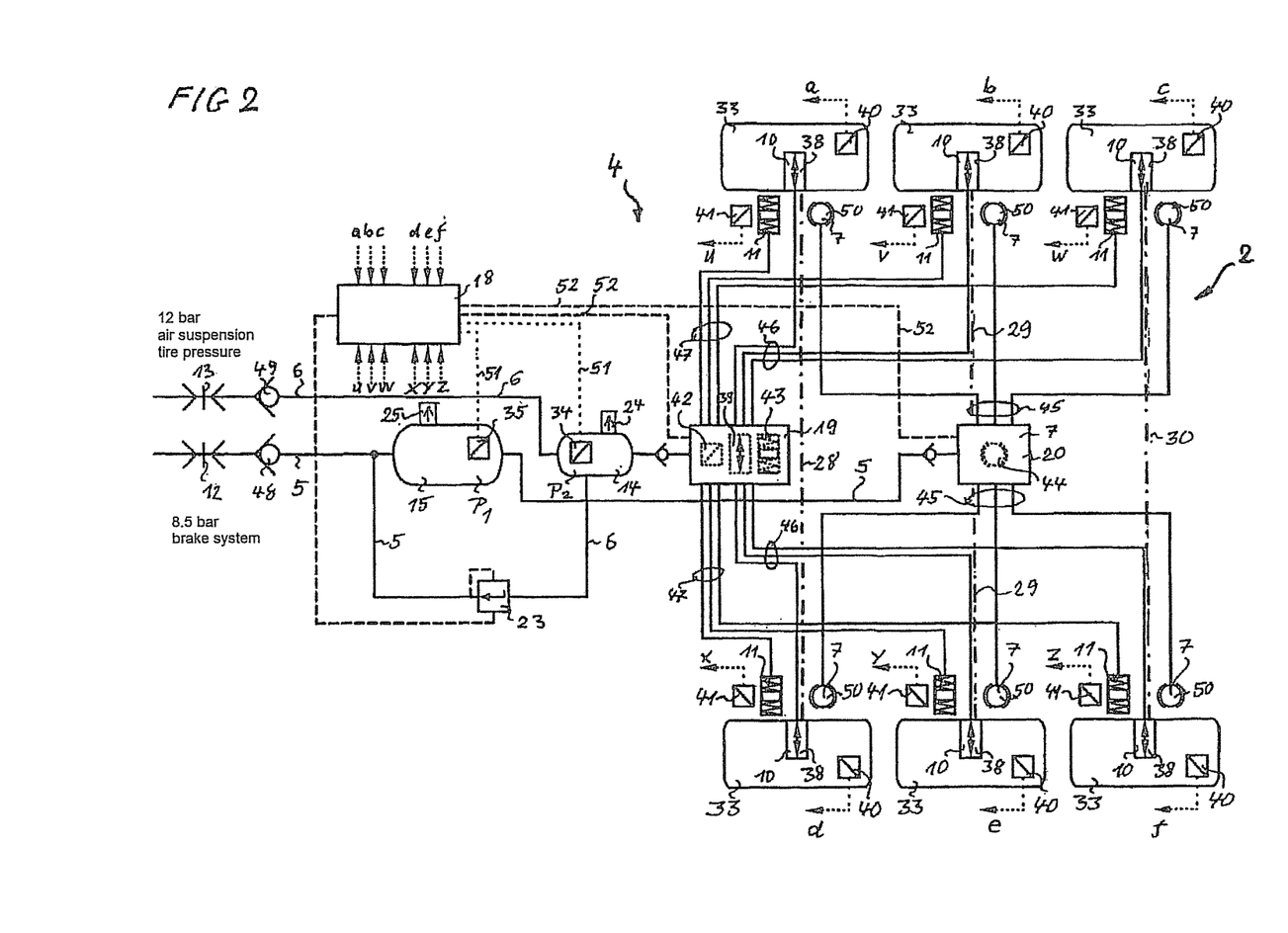
FIG. 2 shows a detailed schematic diagram of a compressed air supply system in accordance with a second embodiment of the present invention.

FIG. 2 shows a detailed schematic diagram of a compressed air supply system 2 in accordance with a second embodiment of the present invention. In this embodiment of the present invention, the compressed air supply is distributed to two compressed air couplings 12 and 13 between a tractive vehicle (not shown here) and a truck trailer 4, a compressed air coupling 12 being designed for an air pressure of up to 8.5 bar or 0.85 MPa for the brake system 7 of the truck trailer 4. In this embodiment of the present invention, the limited air pressure $P_1$ is fed to a compressed air accumulator 15 via a check valve 48. As already shown in FIG. 1, compressed air accumulator 15 has a pressure relief valve 25, which limits the air pressure $P_1$ in compressed air accumulator 15 to 8.5 bar.

In addition, compressed air accumulator 15 has a pressure sensor 35, which transmits the current pressure to a central control device 18 via a signal line 51 indicated by a dotted line. This compressed air accumulator 15 for the limited air pressure $P_1$ supplies a first compressed air network 5, which supplies the brake system 7 for the wheels 33 of the truck trailer 4 by a pressure distribution device 20 via the compressed air lines 45. For this purpose, the pressure distribution device 20, which operates with the limited pressure, is connected to the central control device 18 by at least one control line 52. The pressure distribution device 20 can have a central pressure sensor 44, which monitors the limited air pressure and indicates said pressure to the central control device 18 via at least one corresponding control line 51. For reasons of safety, the wheel brakes 50 are locked or applied when no pressure is applied via the compressed air lines 45. If the wheel brakes 50 receive a pressure of up to 8.5 bar or 0.85 MPa, they are released, and the truck trailer is thus ready to move.

However, such a limited air pressure $P_1$ for the wheel brake system 7 is not sufficient to supply a tire pressure control system 10. In order to be able to actuate the tire pressure control valves 38 for the individual tires 33, an air pressure of between 9 and 15 bar or 0.9 MPa and 1.5 MPa is advantageous, depending on the embodiment of the tire pressure control valves 38 and on the tire configuration itself. For this purpose, the truck trailer 4 has a second compressed air network 6, which is supplied by the tractive vehicle via a compressed air coupling 13 for a higher pressure $P_2$. Connected to this compressed air coupling 13 for the higher pressure is a check valve 49, via which a compressed air accumulator 14 in the truck trailer 4 is supplied. This compressed air accumulator with its sensor 34 and the pressure relief valve 24 corresponds to compressed air accumulator 14 in FIG. 1.

The tire pressure in each individual tire 33 can be measured by a pressure sensor 40 and transmitted via signal lines a, b, c and d, e, f to a central control device 18 via corresponding signal lines. Moreover, it is possible, instead of pressure sensors 40 of this kind in the individual tires 33, to fit a central pressure sensor 42 in a pressure distribution device 19 for the higher air pressure. This higher air pressure is fed to the tire pressure control valves 38 via corresponding compressed air lines 46.

In addition to the possibilities that are shown here for the sensors for each individual tire 33 or of a central tire pressure sensor 42, there is also the possibility of detecting the tire pressure axlewise for each of the axles 28, 29 and 30 and feeding it to the tires 33 of each axle 28, 29 and 30, respectively, via a corresponding pressure distribution device. Instead of the tire pressure control valves 38 distributed among the wheels 33, it is possible to connect a central tire pressure control valve 39 in the pressure distribution device 19 for the increased air pressure, with the result that all the wheels are supplied via this central tire pressure control valve 39 during operation. It is furthermore possible to provide a corresponding tire pressure control valve (not shown here) axlewise for each axle 28, 29 and 30, the construction and operation of said valve corresponding to the central tire pressure control valve 39.

Owing to this second compressed air network 6 of the truck trailer 4, it is additionally possible to supply not only the tire pressure control system 10 but also a spring and damping system 11 with the higher air pressure $P_2$ via the second compressed air network 6. For this purpose, the pressure distribution device has further compressed air lines 47, which supply the spring and damping system 11 with a higher air pressure. As already mentioned above, this has the advantage that the compressed air springs and compressed air damping components can be embodied in a more compact and weight-saving manner.

The pressure in the spring and damping system 11 is measured by the pressure sensors 41 and transmitted to the central control device 18 by the sensor lines u, v, w and x, y, z, enabling this control device 18 to supply each individual pneumatic spring individually with variously adapted air pressure. FIG. 2 furthermore shows a possibility of supplying compressed air accumulator 15 with a limited air pressure $P_1$ via a bypass and a control valve 23 if the sensor 35 indicates that the air pressure $P_1$ has fallen below a threshold that is still permissible.

Figure 3:
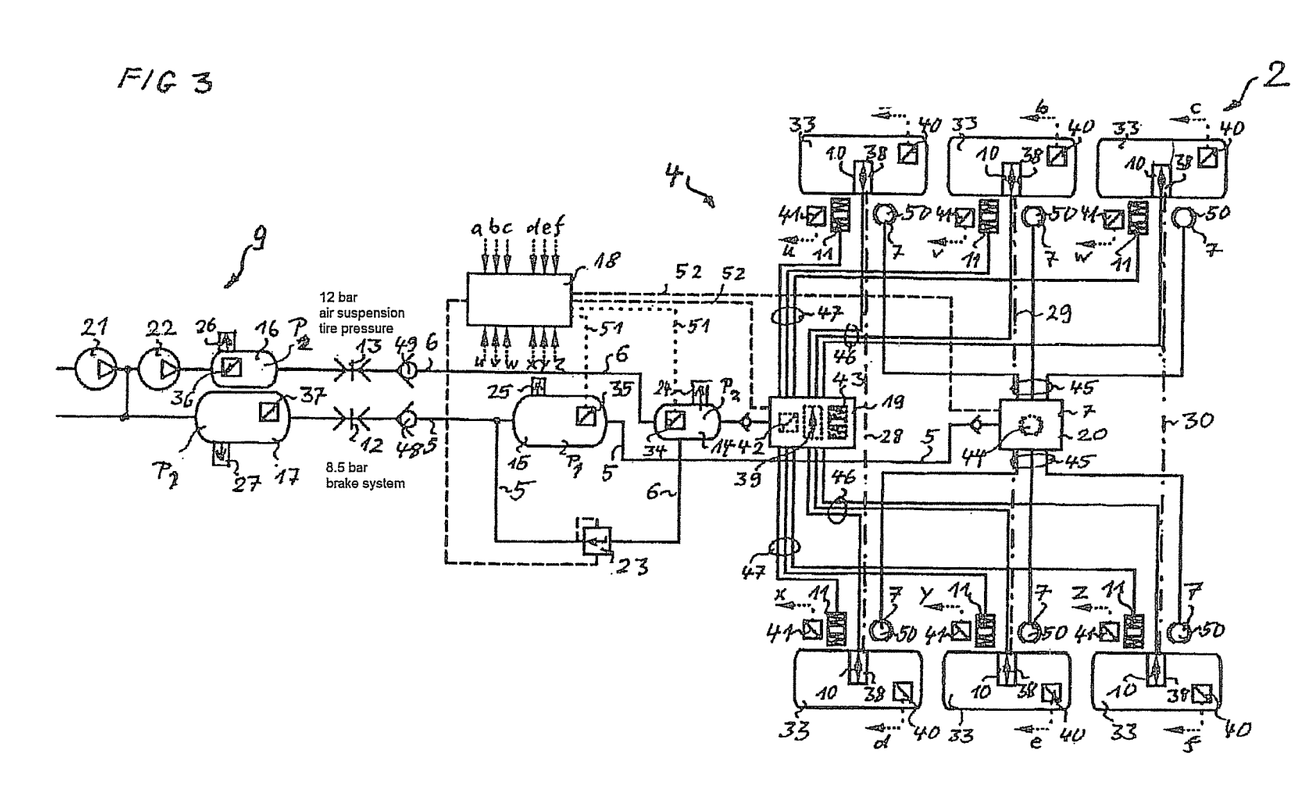
FIG. 3 shows a schematic diagram of the compressed air supply system in accordance with FIG. 2.

FIG. 3 shows a schematic diagram of the compressed air supply system 2 shown in FIG. 2, with components that have the same functions as in FIG. 2 being denoted by the same reference signs and not being discussed specially. The addition over FIGS. 1 and 2 consists in that the structure of the pressure supply system 2 in the tractive vehicle 9 is fitted with two compressors 21 and 22 connected in series. Of these, compressor 22 can be a booster pump, which is driven by the lower air pressure $P_1$ produced by compressor 21 and produces a higher air pressure $P_2$.

In this embodiment of the present invention, the limited air pressure $P_1$ of compressor 21 can be fed in the tractive vehicle 9 to an accumulator 17, which is monitored by a sensor 37 and is limited to 8.5 bar or 0.85 MPa by a pressure relief valve 27. Compressor 22, in the form of a booster pump for example, operates with this reduced air pressure $P_1$ and produces a higher air pressure $P_2$, between 0.9 and 1.5 MPa, for example, which is stored in the accumulator 16 and monitored by a sensor 36, a pressure relief valve 26 protecting the accumulator 16 and the second compressed air network 6 from overloading.

Figure 4:
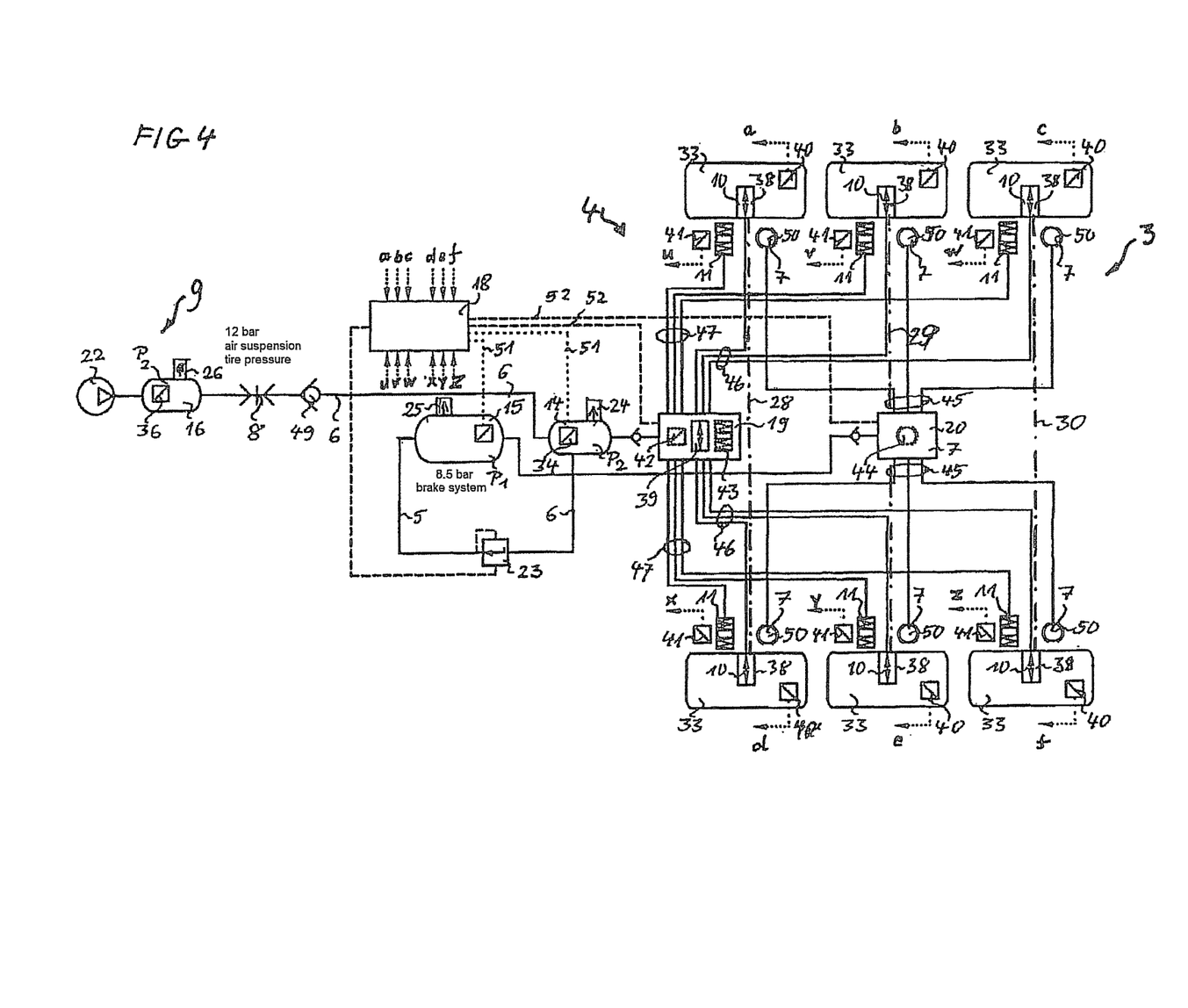
FIG. 4 shows a detailed schematic diagram of a compressed air supply system in accordance with a third embodiment of the present invention.

FIG. 4 shows a detailed schematic diagram of a compressed air supply system 3 in accordance with a third embodiment of the present invention. Components with the same functions as in the preceding figures are denoted by the same reference signs and are not discussed specially. The difference with respect to the previous figures consists in that the tractive vehicle has just one compressor 22, which already produces a higher air pressure $P_2$. This higher air pressure $P_2$ is fed into the second compressed air network 6 of the truck trailer 4 via a single compressed air coupling 13 between the tractive vehicle 9 and the truck trailer 4 and via a check valve 49 without the need for a second compressed air coupling for the limited air pressure $P_1$.

In the truck trailer 4, the higher air pressure $P_2$ is stored in the compressed air accumulator 14 of the second compressed air network 6. The limited air pressure $P_1$ for compressed air network 5 is tapped off from the compressed air accumulator 14 by a pressure control valve 23 and fed to a compressed air accumulator 15 for the limited air pressure $P_1$. This compressed air accumulator 15 then supplies the first compressed air network 5 with a limited air pressure $P_1$ for the brake system 7. The first compressed air network 5 also includes the compressed air lines 45, which emanate from the pressure distribution device 20 for the brake system 7.

For a compressed air supply system 1 to 3 of this kind, it would be advantageous if an appropriate new coupling norm or an appropriate new coupling standard were agreed throughout the EU and/or globally for a compressed air supply coupling between a tractive vehicle 9 and a truck trailer 4. This would have the advantage that both the additional conventional components for additional functions of the truck trailer 4 and also a considerable amount of weight in the truck trailer 4 and in the tractive vehicle 9 could be saved.

LIST OF REFERENCE SIGNS 1 compressed air supply system (first embodiment)
2 compressed air supply system (second embodiment)
3 compressed air supply system (third embodiment)
4 truck trailer
5 first compressed air network
6 second compressed air network
7 pneumatic brake system
8 compressed air supply coupling
9 tractive vehicle
10 tire pressure control system
11 pneumatic spring and damping system
12 first compressed air coupling
13 second compressed air coupling
14 compressed air accumulator (high pressure, trailer)
15 compressed air accumulator (low pressure, trailer)
16 compressed air accumulator (high pressure, tractive, vehicle)
17 compressed air accumulator (low pressure, tractive vehicle)
18 central control device
19 pressure distribution device (high pressure)
20 pressure distribution device (low pressure)
21 low-pressure compressor (tractor)
22 high-pressure compressor (tractor)
23 pressure control valve
24 pressure relief valve of compressed air accumulator 14
25 pressure relief valve of compressed air accumulator 15
26 pressure relief valve of compressed air accumulator 16
27 pressure relief valve of compressed air accumulator 17
28 axle of the trailer
29 axle of the trailer
30 axle of the trailer
31 axle of the tractor
32 axle of the tractor
33 tire of the trailer
34 pressure sensor of accumulator 14
35 pressure sensor of accumulator 15
36 pressure sensor of accumulator 16
37 pressure sensor of accumulator 17
38 tire pressure control valve
39 central tire pressure control valve
40 pressure sensors of the tires
41 pressure sensors of the compressed air springs and/or compressed air dampers
42 central pressure sensor of the tires
43 central pressure sensor of the spring pressure system
44 central pressure sensor of the brake
45 compressed air line (brake system)
46 compressed air line (tire pressure control)
47 compressed air line (spring pressure control system)
48 check valve
49 check valve
50 wheel brake
51 signal line
52 control line
$P_1$ limited air pressure for truck trailers throughout the EU
$P_2$ higher air pressure

The invention claimed is:

1. A compressed air supply system for a truck trailer, comprising:
    at least one first compressed air network, which supplies a pneumatic brake system of the truck trailer with an air pressure limited according to a requirement for the truck trailer;
    at least one compressed air supply coupling between a tractive vehicle and the truck trailer for supplying compressed air;
    wherein the at least one compressed air supply coupling is configured for a higher air pressure than the limited air pressure according to the requirement,
    wherein the at least one compressed air supply coupling is connected to supply a further supply network for the truck trailer with compressed air, and wherein the further supply network includes at least one of a tire pressure monitoring system and an air suspension and damping system, and
    wherein the tractive vehicle produces the limited air pressure, which is stored in a compressed air accumulator of the tractive vehicle, wherein a pressure relief valve responds as soon as the limited air pressure is exceeded, and wherein a higher air pressure is further produced in the tractive vehicle and stored in another compressed air accumulator of the truck trailer, which is protected by another pressure relief valve of the truck trailer.

2. The compressed air supply system of claim 1, wherein the limited air pressure for the truck trailer is 8.5 bar and the at least one compressed air supply coupling is configured for a higher air pressure of up to 15 bar.

3. The compressed air supply system of claim 2, wherein, in addition to the first compressed air network, the truck trailer has a second compressed air network for the higher pressure.

4. The compressed air supply system of claim 3, wherein a tire pressure control system is connected to the second compressed air network of the truck trailer.

5. The compressed air supply system of claim 3, wherein a pneumatic spring and damping system are connected to the second compressed air network of the truck trailer.

6. The compressed air supply system of claim 3, wherein a first compressed air coupling having a first air pressure limit for supplying the first compressed air network of the truck trailer and a second compressed air coupling having a second, higher air pressure limit for supplying the second compressed air network of the truck trailer are arranged between the tractive vehicle and the truck trailer.

7. The compressed air supply system of claim 3, wherein the first compressed air network of the truck trailer is supplied from the second compressed air network, and a single compressed air supply coupling, which is configured for the higher air pressure than the limited air pressure according to the requirement, which is an EU-wide requirement, supplies both compressed air networks of the truck trailer.

8. The compressed air supply system of claim 3, wherein, the accumulator for the truck trailer is configured for the higher air pressure than the limited air pressure according to the requirement, which is an EU-wide requirement, and supplying both compressed air networks of the truck trailer.

9. The compressed air supply system of claim 3, wherein the compressed air networks of the truck trailer interact with a central control device.

10. The compressed air supply system of claim 3, wherein the compressed air networks have separate pressure distribution devices.

11. The compressed air supply system of claim 1, wherein the requirement is an EU-wide legal requirement.

12. The compressed air supply system of claim 1, wherein the limited air pressure for the truck trailer is 8.5 bar and the at least one compressed air supply coupling is configured for a higher air pressure of up to 12 bar.

13. A compressed air supply method for a truck trailer, the method comprising:
producing an air pressure in a tractive vehicle which is higher than a limited air pressure according to a requirement for the truck trailer;
transferring the higher air pressure via at least one compressed air supply coupling, which is configured for a higher air pressure than the limited air pressure according to the requirement; and
supplying a first compressed air network in the truck trailer with an air pressure permitted throughout a region and a second compressed air network with a higher air pressure via the at least one compressed air supply coupling;
wherein the at least one compressed air supply coupling is connected to supply a further supply network for the truck trailer with compressed air, and wherein the further supply network includes at least one of a tire pressure monitoring system and an air suspension and damping system, and
wherein the tractive vehicle produces the limited air pressure, which is stored in a compressed air accumulator of the tractive vehicle, wherein a pressure relief valve responds as soon as the limited air pressure is exceeded, and wherein a higher air pressure is further produced in the tractive vehicle and stored in another compressed air accumulator of the truck trailer, which is protected by another pressure relief valve of the truck trailer.

14. The compressed air supply method of claim 13, wherein the limited air pressure for the truck trailer is limited to 8.5 bar and the at least one compressed air supply coupling is configured for the higher air pressure of up to 15 bar.

15. The compressed air supply method of claim 13, wherein the first compressed air network of the truck trailer and the second compressed air network are supplied with the higher air pressure.

16. The compressed air supply method of claim 15, wherein the first compressed air coupling has a first air pressure limit for supplying the first compressed air network of the truck trailer and a second compressed air coupling having a second, higher air pressure limit for supplying the second compressed air network of the truck trailer are arranged between the tractive vehicle and the truck trailer.

17. The compressed air supply method of claim 15, wherein the first compressed air network of the truck trailer is supplied from the second compressed air network, and a single compressed air supply coupling, which is configured for the higher air pressure than the limited air pressure according to the requirement, which is an EU-wide requirement, supplies both of the compressed air networks of the truck trailer.

18. The compressed air supply method of claim 15, wherein compressed air for the compressed air networks of the truck trailer is stored at least in the compressed air accumulator for the truck trailer, which is configured for the higher air pressure than the limited air pressure according to the requirement, which is an EU-wide requirement, and both of the compressed air networks of the truck trailer are supplied from the compressed air accumulator of the truck trailer.

19. The compressed air supply method of claim 15, wherein a central control device controls the compressed air networks of the truck trailer.

20. The compressed air supply method of claim 15, wherein the compressed air networks are supplied via separate pressure distribution devices.

21. The compressed air supply method of claim 13, wherein the requirement is an EU-wide legal requirement.

22. The compressed air supply method of claim 13, wherein the limited air pressure for the truck trailer is limited to 8.5 bar and the at least one compressed air supply coupling is configured for the higher air pressure of up to 12 bar.

* * * * *